C. J. W. HAYES.
MACHINE FOR MANUFACTURING EXPANDED METAL.
APPLICATION FILED SEPT. 9, 1907.
1,125,526.
Patented Jan. 19, 1915.
4 SHEETS—SHEET 1.
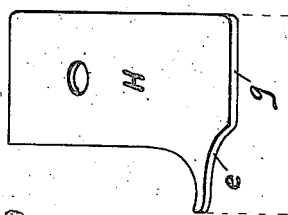
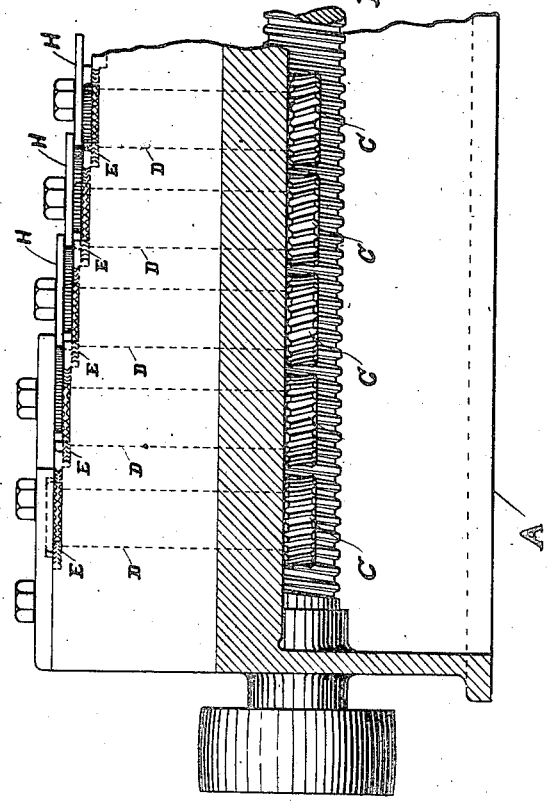
WITNESSES
INVENTOR
Chas. J. W. Hayes
By Whittemore, Hulbert & Whittemore
attys

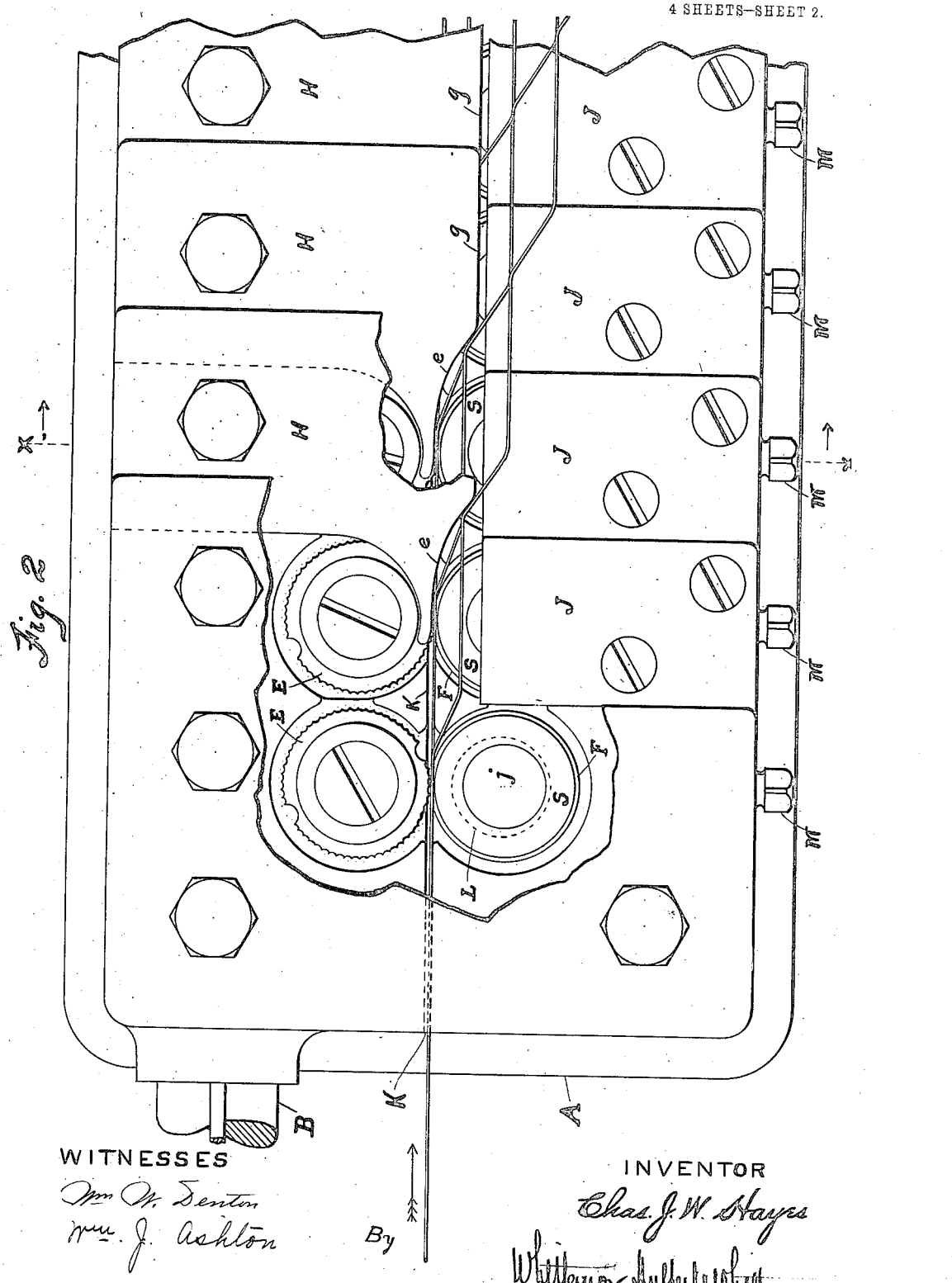

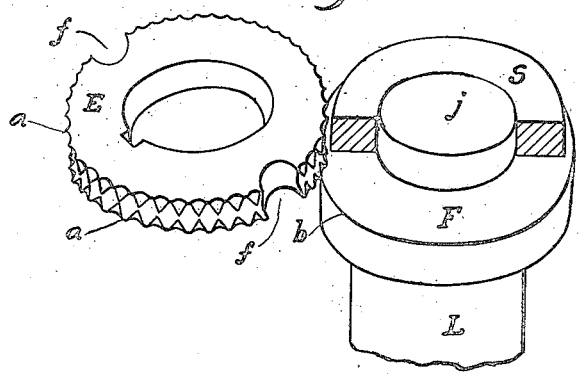
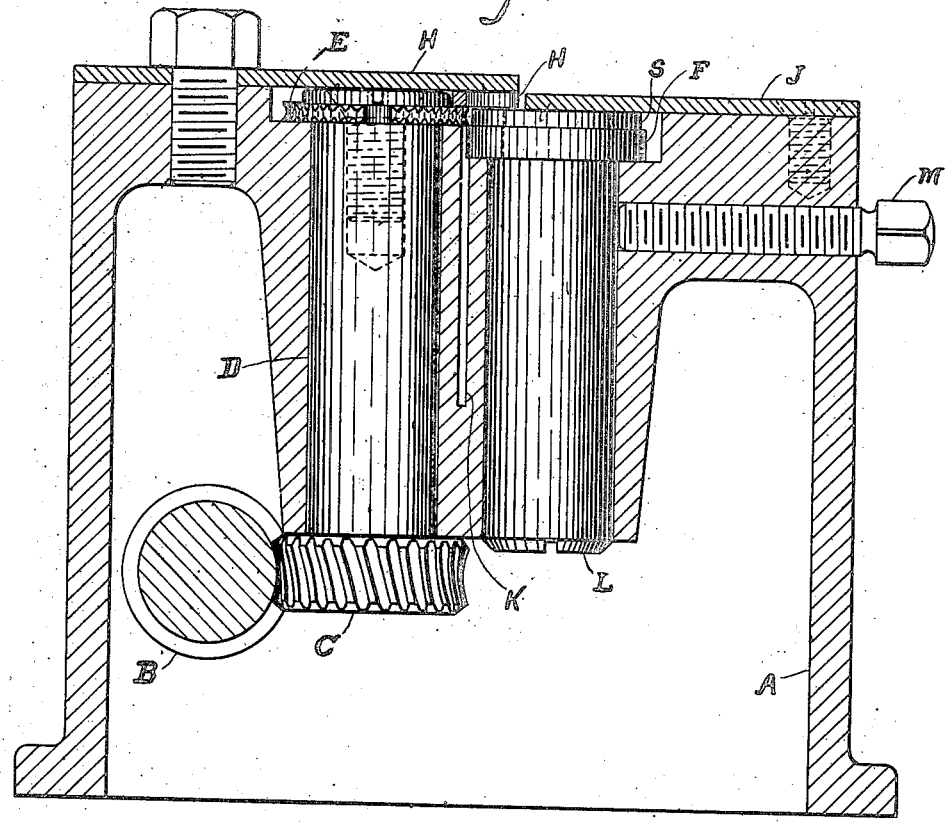

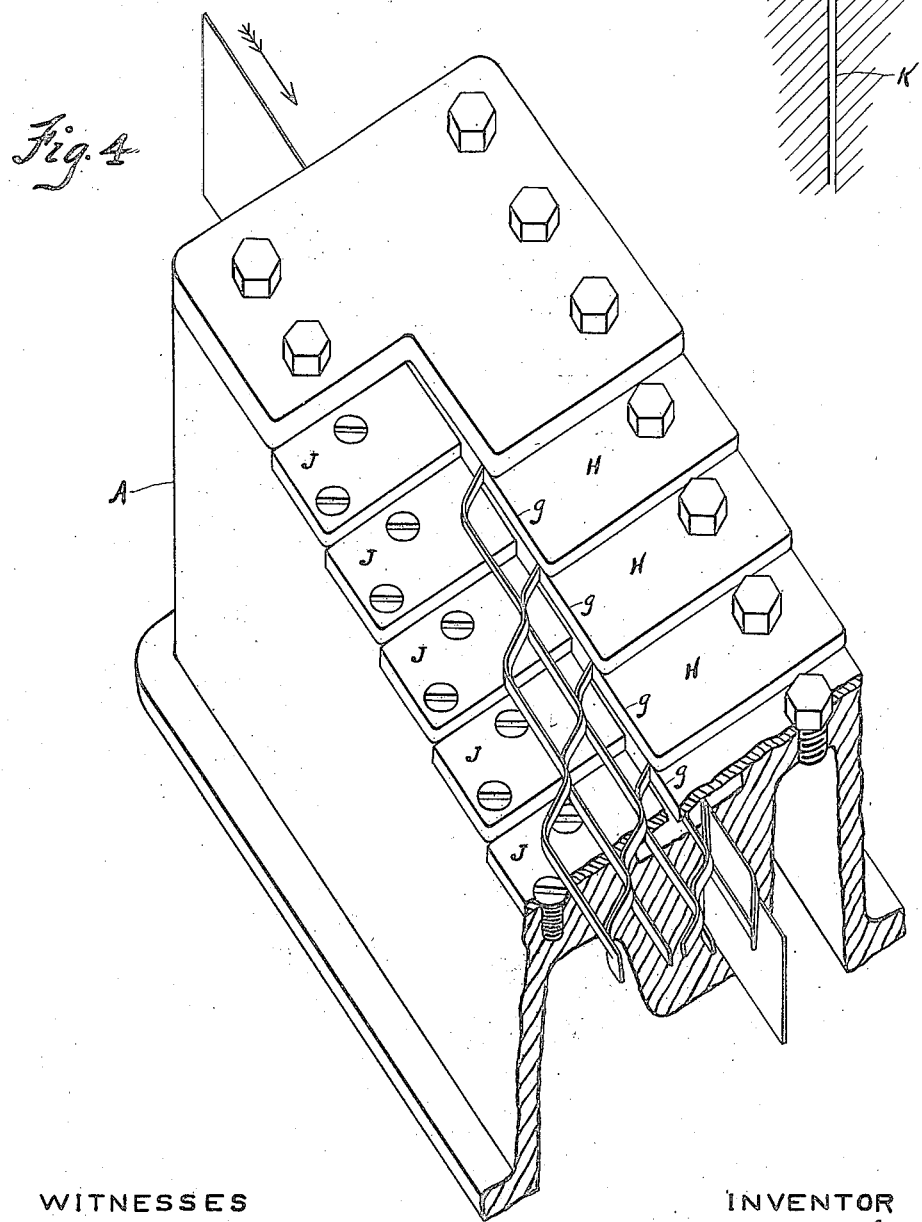

UNITED STATES PATENT OFFICE.

CHARLES J. W. HAYES, OF DETROIT, MICHIGAN, ASSIGNOR, BY MESNE ASSIGNMENTS, TO BRECKINRIDGE JONES, TRUSTEE, OF ST. LOUIS, MISSOURI.

MACHINE FOR MANUFACTURING EXPANDED METAL.

1,125,526.

Specification of Letters Patent.

Patented Jan. 19, 1915.

Application filed September 9, 1907. Serial No. 391,957.

*To all whom it may concern:*

Be it known that I, CHARLES J. W. HAYES, a citizen of the United States of America, residing at Detroit, in the county of Wayne and State of Michigan, have invented certain new and useful Improvements in Machines for Manufacturing Expanded Metal, of which the following is a specification, reference being had therein to the accompanying drawings.

The invention relates to machines for the manufacture of the product commonly known as expanded metal, and which consists of a slitted sheet of metal having the strands thereof bent to form an open-mesh fabric.

It is the object of the invention to obtain a simple construction of mechanism for forming the said product, and to this end the invention consists in certain novel features of construction, with special reference to the means for expanding or deflecting the strands of the fabric during the feeding movement incident to the slitting operation; further, in the arrangement of the stationary deflectors for causing the expansion; further in the novel arrangement of a stepped series of slitting cutters and stationary deflectors; further in the novel construction of the slitting cutters; and further in the peculiar construction, arrangement and combination of the parts as hereinafter set forth.

In the drawings, Figure 1 is a side elevation showing the frame of the machine partly in section along line of slot; Fig. 2 is a plan view of a portion of the machine showing a strip of the metal operated upon in the machine. One series of strands is shown not fully expanded. Fig. 3 is a cross section at $x$—$x$ of Fig. 2. Fig. 4 is a perspective view of a portion of the machine showing the relation to the machine of the metal operated upon. Fig. 5 is a perspective view of one of the stationary deflectors. Fig. 6 is a perspective view of a pair of cutting and feeding disks and an abutment disk in section showing their working relation. Fig. 7 is a cross sectional view of slot as at any point midway between pairs of cutting disks.

In general construction, my improved machine comprises a series of pairs of slitting cutters adapted to simultaneously slit the blank and feed the same forward, together with a coöperating series of stationary members for laterally deflecting the strands of the slitted sheet. As shown, A is a suitable frame, in which is journaled a longitudinally extending worm-shaft B, which meshes with a series of worm gears C, respectively mounted upon vertical shafts or arbors D, also journaled in the frame. At the upper end of each of these vertical shafts or arbors is mounted a cutter disk E, which coöperates with an adjacent cutter disk F mounted upon a stationary journal $j$. These cutter disks are arranged to form a stepped series, each succeeding pair being located in a lower plane, separated from the plane of the preceding pair by a space equal to the width of a strand of the fabric. Thus if a strip of sheet metal is fed between the pairs of disks it will be successively slitted in a diagonal line across the width of the sheet. The disks E and F, in addition to their function of slitting the sheet, also form feeders for advancing the sheet during the operation of expanding, as will be hereinafter described. To this end each of the disks E is preferably formed with a serrated or toothed edge $a$, which overlaps the peripheral edge $b$ of the disk F. Above the disk F is another disk S of lesser diameter, which is arranged opposite the disk E and coöperates with it in feeding. The disk E is preferably peripherally grooved, so as to form an acute angle cross section in relation to each of its sides. It is further provided with one or more peripheral recesses or cut away portions $f$, two being shown in the drawing, which interrupt the continuity of the slitting of the sheet and form the bonds between adjacent strands. Thus in operation, as the metal sheet is fed between the disks E, F and S, the teeth $a$ will be embedded in the sheet to firmly grip the same and produce a positive forward feeding movement at the same time. As the teeth $a$ completely overlap the disk F they will shear the sheet to form the separate strands, while the disk S will form a coöperating abutment for retaining the gripping action of the teeth $a$.

As has been stated, the expanding operation is performed without movement of the parts other than those necessary to the forward movement of the sheet. This is accomplished by arranging in the path of each strand, as it passes from the slitting cutters, a stationary deflector H. This is a plate having a suitably formed edge $e$ to cause a gradual bending and lateral deflection of the strands during forward movement until the desired degree of openness of mesh is effected, when the engaging portion of the strand slips past the deflecting edge and resumes a directly forward motion. As shown, the deflectors H are secured to the frame by cap screws and lap over one another covering the disks E. These plates are also provided with straight-edge portions $g$. Upon the frame A and opposite each deflector plate, but upon a lower plane, is secured a straight edged plate J partially covering and retaining disks F and S and separated from the plate H by a space somewhat wider than the gage of the metal operated on. These straight edges on said plates form guides for preventing distortion of the strands and for retaining the metal at the desired degree of expansion.

For guiding the metal sheet as it is fed between the cutters of the series, suitable guides are arranged, preferably as shown, by forming a slot K in the frame through which the sheet metal is passed. This will retain the body or unslitted portion of the metal in the plane of feed, and limit the bending to the slitted strands.

With the construction as described in operation a sheet of metal of suitable gage and any width less than the depth of slot is inserted in the slot K, and moved into engagement with a pair of slitting disks E and F. Rotary motion being communicated to the worm shaft B, each of the worm wheels C, together with the arbor D on which the same is mounted, will be driven, which will impart rotary movement to the toothed cutter disk E. This will cause the forward feeding of the sheet and simultaneous slitting of the same to form a strand. As the sheet advances it will successively pass into engagement with other pairs of slitting disks E and F of the series, the number of which will be determined by the width of the sheet operated on. Each of the deflectors H is so arranged in relation to the cutting disks that in the forward movement of the slitted sheet the bonded portion of the strands will engage and ride along the inclined or cam face of the deflector, simultaneously bending the adjacent strands connected by the bond until it rides off the cam face on to the straight edge of the plates and forward along these guides until another bonded portion succeeding engages the cam face when the operation will repeat, forcing intermittently the rows of strands expanded farther and farther out. This action, after the sheet is in full engagement, will simultaneously occur throughout the entire series and consequently advancement equal to the length of a strand will cause the expansion of a diagonal series of strands extending across the entire width of the sheet.

It will be understood that with my construction I am able to accomplish by the stationary deflectors H that which has heretofore been accomplished only by the use of a multiplicity of moving parts.

In its simplest conception, the frame A of the machine, with its slot and the series of plates H and J, may be regarded together as forming simply a guideway or sort of drawing die by which the slitted metal is shaped in passing through it. With my construction, there is no practical limit to the width or length of sheet that may be expanded, it being only necessary to provide a sufficient extension of the series of parts.

For convenience of adjustment, I preferably journal the disks F and S upon eccentric reduced end portion $j$ of the vertical shaft or post L secured from rotation in the frame by set screws M. This arrangement permits of adjusting disks F and S toward or away from their coöperating disks E by loosening the set screw M and rotating the post L with its eccentric journal.

What I claim as my invention is:

1. In a machine for making expanded metal, the combination with means for advancing a slitted sheet, of a plurality of stationary members in the path of the strands of said sheet, forming deflectors for expanding the same, said members producing the entire expansion of the sheet.

2. In a machine for making expanded metal, the combination with means for simultaneously advancing a sheet and slitting the same to form bonded strands, of a stationary member of substantially the same width as a strand of the slitted sheet for engaging the bonded portion of adjacent strands to deflect the same from the plane of the sheet during the longitudinal movement of the same.

3. In a machine for making expanded metal, the combination with means for simultaneously advancing a sheet and slitting the same to form bonded parallel series of strands, of a series of stationary deflectors for expanding the metal during the longitudinal feeding movement thereof, said deflectors being stepped in a plane parallel with the plane of movement of the sheet.

4. In a machine for making expanded metal, a slitting cutter provided with a serrated or toothed shearing edge, the serrated or toothed portions of the shearing edge being active.

5. In a machine for making expanded metal, a rotary shearing cutter provided with a serrated or toothed shearing edge, the serrated or toothed portions of the shearing edge being active, and a coöperating overlapping shearing member.

6. In a machine for making expanded metal, a rotary shearing cutter having a toothed or serrated shearing edge of acute angle cross section, the serrated or toothed portions of the shearing edge being active, and a coöperating rotary cutter overlapping the teeth of the first-mentioned cutter.

7. In a machine for making expanded metal, a stepped series of pairs of rotary shearing cutters, and coöperating stationary means for expanding the slitted strand in proximity to each pair of cutters.

8. In a machine for making expanded metal, a series of pairs of combined slitting cutters and feeding rolls and a stationary deflector adjacent each pair of cutters for expanding the strand cut thereby.

9. In a machine for making expanded metal, the combination with means for advancing a slitted metal sheet, of a guide for retaining the body portion of said sheet in the plane of feed, and a series of stationary deflectors for successively expanding the strands of the sheet during the longitudinal feeding thereof.

10. In a machine for making expanded metal, in combination with a frame comprising a guideway for the metal, a series of rotary arbors in stepped relation to each other, rotary slitting cutters mounted on said arbors, and a drive shaft extending the length of said series and connecting gearing for communicating rotary movement from said shaft to each of the arbors.

11. A machine for making expanded metal comprising a guide for a slitted metallic sheet, a portion of said guide being arranged to retain said sheet in a fixed plane, and another portion being adapted to deflect the strands of the sheet during the movement thereof through the guide whereby the sheet is expanded.

12. In a machine for making expanded metal, a shearing disk having a portion of its periphery, for forming in the sheet a slit of corresponding length, toothed or serrated to grip and positively advance the sheet.

13. In a machine for making expanded metal, the combination of a frame comprising a guideway of gradually decreasing depth for the metal and a series of pairs of slitting cutters arranged in stepped relation to each other and along said guideway.

14. A machine for making expanded metal comprising a guideway with shaped stationary restraining walls adapted to expand a slitted sheet in passing through it and means for forcing said sheet through said guideway.

15. In a machine for making expanded metal, the combination of a frame comprising a guideway of gradually decreasing depth for the metal, a series of pairs of slitting cutters arranged in stepped relation to each other and along said guideway, and stationary members in the path of the strands of said sheet forming deflectors for expanding the same.

16. In a machine for expanding metal, a stepped series of pairs of rotary shearing cutters, and a coöperating stepped series of stationary deflectors for expanding the strands, there being one deflector for each pair of cutters.

17. In a machine for making expanded metal, the combination with means for advancing a sheet and simultaneously slitting the same to form bonded strands, of members in the path of said strands adjacent said means forming deflectors for expanding the strands, said members producing the entire expansion of the sheet.

18. In a machine for making expanded metal, the combination with means for slitting a sheet to form bonded strands, of separate means for expanding each strand separately and independently and operating immediately after the slitting means.

19. In a machine for making expanded metal, the combination with means for slitting a sheet to form bonded strands, of separate stationary means for expanding the strands and operating immediately after the slitting means.

20. In a machine for making expanded metal, the combination with means for slitting a sheet with successive series of cuts arranged diagonally of the sheet to form bonded strands, of separate means for expanding the strands and operating immediately after said slitting means on successive diagonally arranged series of the slitted and bonded strands as the sheet advances.

21. In a machine for making expanded metal, the combination with a stepped series of slitters adapted to form the sheet into bonded strands, of means for expanding the strands and so arranged that while one strand is being cut, the next one adjacent it transversely of the sheet and in advance thereof is being opened.

22. In a machine of the character described, in combination: a plurality of rotatable slitters adapted to slit a sheet to form bonded strands; and independent stationary means for expanding the strands as the sheet moves thereover and operating immediately after the slitters, substantially as specified.

23. In a machine of the character described, the combination of a plurality of slitters adapted to slit a sheet to form bonded strands, an independent means for spreading said strands without altering the direction of movement of said sheet, substantially as specified.

24. In a machine of the character described, in combination, a plurality of rotatable slitters adapted to slit a sheet to form bonded strands and stationary means disposed adjacent said rotatable slitters for expanding the strands automatically without altering the direction of movement of the sheet, substantially as specified.

In testimony whereof I affix my signature in presence of two witnesses.

CHARLES J. W. HAYES.

Witnesses:
 JAMES P. BARRY,
 NELLIE KINSELLA.